United States Patent [19]
Maffey

[11] Patent Number: 4,553,415
[45] Date of Patent: Nov. 19, 1985

[54] TRAILER KINGPIN LOCKING DEVICE WITH PROTECTED LOCKING BAR APERTURE

[76] Inventor: Constant O. Maffey, 34 Burchfield Ave., Cranford, N.J. 07016

[21] Appl. No.: 671,989

[22] Filed: Nov. 16, 1984

[51] Int. Cl.⁴ .............................................. F16B 41/00
[52] U.S. Cl. ........................................ 70/232; 70/360; 70/417
[58] Field of Search .................. 70/232, 229, 231, 360, 70/361, 417

[56] References Cited

U.S. PATENT DOCUMENTS

| | | | |
|---|---|---|---|
| 2,554,306 | 5/1951 | Mack | 280/33.05 |
| 2,641,124 | 6/1953 | Gallagher et al. | 70/232 |
| 2,755,655 | 7/1956 | Maffey | 70/232 |
| 2,910,860 | 11/1959 | Camba | 70/360 |
| 3,415,085 | 12/1968 | Eble, Jr. | 70/232 |
| 3,600,914 | 8/1971 | Johnson | 70/232 |
| 3,706,211 | 12/1972 | Owen | 70/232 |
| 3,782,146 | 1/1974 | Franke | 70/232 |
| 3,795,123 | 3/1974 | Stiffel | 70/417 |
| 3,798,938 | 3/1974 | McCullum | 70/417 |
| 3,913,880 | 10/1975 | Lucasey | 70/232 |
| 4,031,727 | 6/1977 | DeGroat et al. | 70/232 |
| 4,269,048 | 5/1981 | McDorman | 70/13 |
| 4,418,554 | 12/1983 | Wolfgang | 70/360 |

FOREIGN PATENT DOCUMENTS 689737   6/1964   Canada .

*Primary Examiner*—Robert L. Wolfe
*Attorney, Agent, or Firm*—Richard L. Cannaday; Frank J. DeRosa; Edwin T. Yates

[57] ABSTRACT

A locking device to be locked onto the kingpin of a trailer to prevent its being engaged by the fifth wheel of an unauthorized tractor. The locking device closely encircles the kingpin and houses within an aperture a locking bar that is adapted to be pressed into engagement with the kingpin recess or groove. The outer wall of the locking device casing has a protrusion in the area of the locking bar aperture such that the locking bar and the locking unit disposed therein are recessed within the aperture and thereby protected. The locking bar aperture from the outer end of the locking bar when in the locked position to the outer wall of the protrusion on the casing is counterbored beyond the transverse cross-section of the locking bar. Thus, if a careless driver attempts to couple a tractor to a trailer having a locking device in place, the locking mechanism will be protected and the abuse inflicted on the locking device in the area of the locking bar aperture will cause burring to the counterbored part of the aperture only. Such burring will not interfere with insertion or withdrawal of the locking bar.

4 Claims, 4 Drawing Figures

TRAILER KINGPIN LOCKING DEVICE WITH PROTECTED LOCKING BAR APERTURE

BACKGROUND OF THE INVENTION

This invention relates to a locking device for trailer kingpins. In the conventional trailer construction, the trailer chassis is provided with a kingpin depending vertically therefrom, said kingpin having a recess, or groove, disposed circumferentially therein. The trailer is typically provided with a skid plate having an opening through which the trailer kingpin extends, and the trailer is coupled to the tractor by backing the tractor up to the kingpin which is engaged by a complementary unit, or fifth wheel, on said tractor. The trailer-tractor combination is commonly used for the transportation of freight. When the destination is reached, the trailer is usually uncoupled from its tractor to await the unloading of the cargo. It is also frequently desirable to uncouple the tractor from the trailer for the convenience of the driver before and during loading as well as after unloading. It is frequently necessary to leave the trailer unattended on occasions such as those mentioned above, with the result that highjackers, on constant lookout for such situations, couple the trailer to another tractor and drive off with the cargo.

The annual loss sustained by shippers and insurance companies due to highjacking of trailers is very substantial. Apart from the monetary injury suffered, the trucking concern whose trailer has been highjacked often finds it difficult to obtain new insurance, and without adequate insurance, soon finds itself in financial difficulty, as few shippers will entrust their cargo to an uninsured trucking concern.

To obviate the shipping hazards mentioned above, as well as to reduce insurance costs to trucking companies, there have been devised a number of locking devices which, when fitted to a trailer kingpin, provide an effective safeguard against coupling the trailer to a tractor by an unauthorized person. A typical locking device for trailer kingpins is described in U.S. Pat. No. 2,755,655, issued July 24, 1956. The locking device described therein is a casing which encircles the kingpin and is locked thereto by a slidable locking bar within an aperture in said casing, the locking bar having a key-actuated lock unit disposed therein. When the locking bar is in the locked position, its inner end enters the recess, or groove, of the trailer kingpin and its outer end is flush with the outer wall of the casing. However, if a careless driver attempts to couple a tractor to a trailer having such a locking device in place, the fifth wheel of the tractor will strike the locking device with sufficient force to cause deformation and burring to the metal. If the damage so inflicted occurs in the area of the locking bar and the key-actuated lock unit, the locking bar or the lock unit may be damaged. In addition, the opening to the aperture containing the locking bar may be burred so that the locking bar will no longer slide to allow the locking device to be disengaged from the kingpin.

SUMMARY OF THE INVENTION

The present invention is designed to provide an improved locking device for trailer kingpins in which the locking bar and key-actuated lock unit will be protected if an attempt is made to couple a tractor to a trailer with the locking device in place on the kingpin. Moreover, if the aperture containing the locking bar is burred by the fifth wheel of a trailer, or by any other event, the locking bar will still be capable of sliding to engage or disengage the kingpin recess.

It is, therefore, an object of this invention to provide a locking device for trailer kingpins to prevent highjacking and thereby reduce losses and insurance costs to truckers.

It is another object of this invention to provide a locking device for trailer kingpins which will not be rendered inoperable if a careless driver attempts to couple a tractor to a trailer having the locking device in place on the kingpin.

The foregoing and other objects are accomplished by the trailer kingpin locking device of my invention. Broadly, this invention consists of a locking device for use in connection with a trailer kingpin having a circumferential recess therein, said locking device comprising:

1. A casing having an aperture therein for receiving the kingpin and having a substantially thick wall surrounding said aperture, said casing being provided with a second aperture extending completely through the wall thereof and opening into said first aperture;

2. A locking bar having an inner end and an outer end and slidably disposed in said second aperture whereby upon predetermined inward sliding movement thereof, its inner end enters said recess in the kingpin, and 3. A locking means disposed within the locking bar and engagable with and releasable from said casing, the improvement in said locking device comprising a protrusion on the outer wall of the casing in the area of the second aperture whereby the outer end of said locking bar is recessed within said second aperture.

The instant invention thus provides a locking device for trailer kingpins in which the locking bar and the locking means are protected from damage such as that inflicted when a driver accidentally attempts to couple a tractor to a trailer which has the locking device in place on the kingpin thereof. The nature and substance of the present invention as well as its objects and advantages will be more clearly perceived and fully understood by referring to the following description and claims taken in connection with the accompanying drawings which are described briefly below.

DESCRIPTION OF THE PREFERRED EMBODIMENTS

The locking device of the present invention is characterized by a structure wherein the locking bar and locking means are recessed within an aperture in the casing of the locking device when the locking bar is in the locked position on a trailer kingpin. The locking bar and locking device are thus protected from damage that could be inflicted on the locking device if an attempt be made to couple a tractor to the kingpin of a trailer having the locking device in place.

The foregoing is accomplished by means of a protrusion on the outer wall of the locking device casing in the area of the locking bar aperture. Moveover, the locking bar aperture from the outer end of the locking bar when in the locked position as extending into the recess in the trailer kingpin to the outer wall of the protrusion on the casing is counterbored beyond the transverse cross section of the locking bar. Thus, if damage inflicted on the locking device in the area of the locking bar aperture include deformation and burring of the outer opening of that aperture, there is still adequate clearance to permit insertion and withdrawal of the locking bar. That is, burring of the counterbored portion of the concerned aperture will not prevent the recessed locking bar from being withdrawn from the locked position and the device itself, as would quite likely happen from outer opening burring if the entire locking bar aperture were of a constant cross section essentially that of the locking bar.

While the shape of the locking device is not critical, it is preferred for saving weight and material that the casing be generally cylindrical. The protrusion on the outer wall of the casing may be added by being welded or bolted or otherwise separately attached to that wall. However, it is convenient that the protrusion be unitary with the casing, i.e., the casing with the protrusion be a unitary forging or casting.

Figure 1:
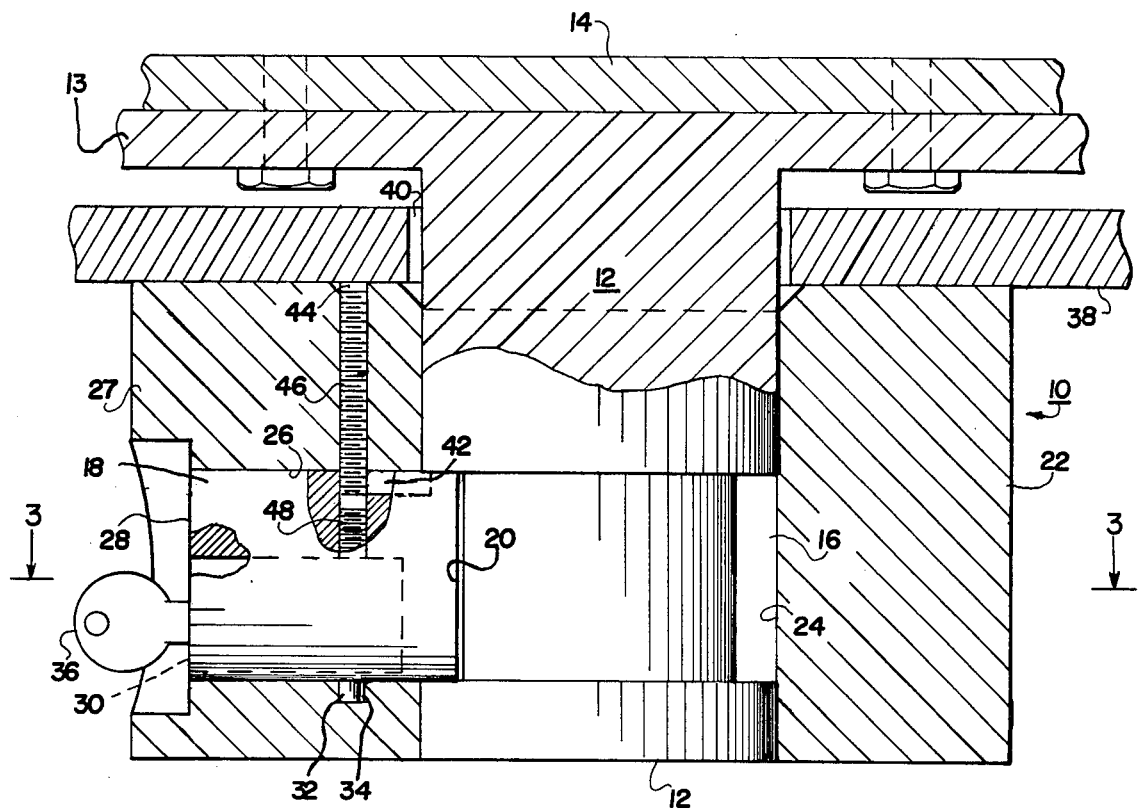
FIG. 1 is a medial, vertical elevational view taken through FIG. 3 along line 1—1 therein of the locking device of the instant invention shown secured to a trailer kingpin in locked position thereon, the trailer kingpin being shown partly sectional and partly elevational.
Figure 2:
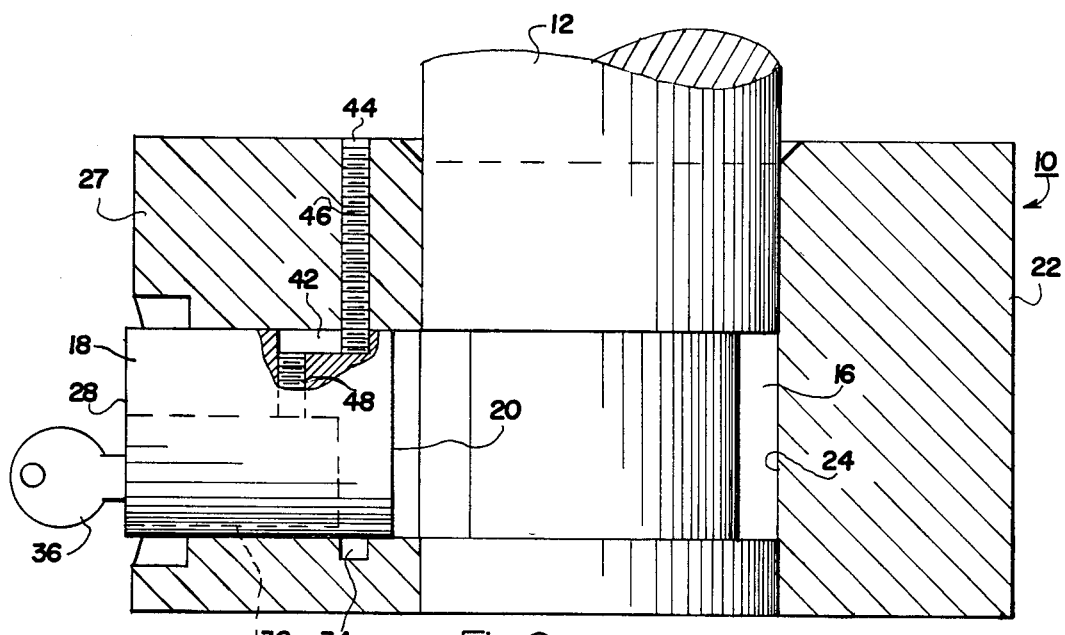
FIG. 2 is a similar view showing the locking bar withdrawn from the kingpin recess to permit removal of the locking device of this invention from the kingpin, indicating likewise the position of the device on the kingpin just prior to being locked thereto or removed therefrom.
Figure 3:
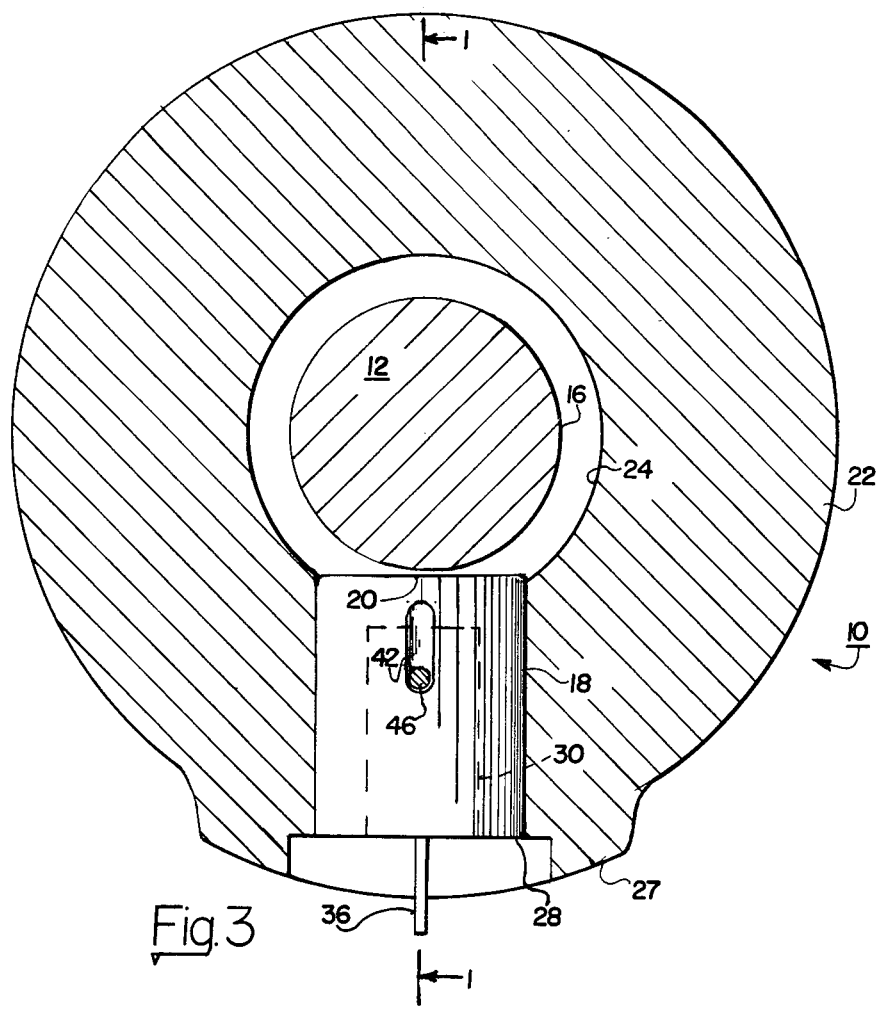
FIG. 3 is a plan view taken through FIG. 1 along line 3—3 therein, particularly showing the protective protrusion.

Referring to FIGS. 1, 2 and 3 of the drawings, the locking device of this invention is indicated by the reference number 10, and is adapted for connection to kingpin 12 which extends downwardly from flange 13 bolted to trailer chassis 14. The kingpin has a recess 16 disposed circumferentially thereon which is engaged by locking bar 18 of the inventive device. The inner end 20 of locking bar 18 is projected into the recess 16 when the locking bar is in its locked position as shown in FIG. 1. Unauthorized removal of the locking device from the trailer kingpin is thereby precluded.

The locking device 10 comprises a cylindrical casing 22 having an axial aperture 24 therethrough for reception of kingpin 12 whereby said locking device is disposed thereon. Casing 22 has a second aperture 26 disposed completely through said casing and opening into the first mentioned aperture 24. The outer wall of casing 22 has a unitarily or integrally formed protrusion 27 in the area of the outer opening of second aperture 26 as seen in FIG. 3. The parts of the locking device are so proportioned that when casing 22 is positioned on kingpin 12, second aperture 26 of said casing will be aligned with kingpin recess 16. Locking bar 18 is slidably disposed in second aperture 26 so that, in one position thereof as illustrated in FIG. 1, the end 20 of said locking bar will be projected into recess 16 of the kingpin to lock the locking device thereto. In the other position of the locking bar, as illustrated in FIG. 2, the end 20 of the locking bar 18 is withdrawn, or disengaged, clear of first aperture 24 of casing 22, so that the locking device may be removed from said kingpin. The outer end of aperture 26 from outer end 28 of locking bar 18, when said locking bar is in the locked or engaged position, to the outer wall of the protrusion 27 in casing 22 is counterbored to a cross-section greater than that portion of aperture 26 which contains said locking bar when the locking bar is in the locked, or engaged, position. Locking bar 18, when in the locked position, conforms cross-sectionally to that portion of aperture 26 in which it is disposed.

In order to hold locking bar 18 in the locked, or engaged, position shown in FIG. 1, a lock unit 30, which may be key-actuated and of conventional form, is disposed in said locking bar and is provided with a bolt 32 which is projected from lock unit 30 into recess 34 in the wall of second aperture 26 upon actuation by key 36. The operation of lock unit 30 may be the reverse of that described, i.e., bolt 32 may be designed to automatically project itself into recess 34 on insertion of locking bar 18 into second aperture 26, and a key might then be required to withdraw bolt 32 from recess 34. Thus, casing 22 is locked to kingpin 12 and may be withdrawn only upon insertion of key 36 and actuation thereby of lock unit 30. It will be noted from an examination of the drawings that the parts are preferably so proportioned that casing 22 is of equal length to that of the depending portion of trailer kingpin 12 so that the locking device, when it is locked to kingpin 12, fits against the trailer or against skid plate 38 of the trailer, said skid plate 38 having an opening 40 through which kingpin 12 depends. Thus, the locking device forms essentially a snug unit with kingpin 12 and closes against skid plate 38, thereby shielding skid plate opening 40 and preventing access to kingpin 12 or its recess 16. It will also be noted that when locking bar 18 is in the locked position, outer end 28 thereof is flush with the wall of casing 22 within the recess provided by the counterbored portion of second aperture 26. Thus, locking bar 18 and lock unit 30 are resistant to tampering and, in addition, are protected from damage.

Locking bar 18 may be so secured to casing 22 that it will have the limited movement which is required to permit sliding of said locking bar only to permit moving its inner end 20 out of axial aperture 24 of said casing. For that purpose, a recess 42 of lesser length than second aperture 26 is provided in locking bar 18. Casing 22 is provided with a third aperture 44 disposed at right angles to second aperture 26, said third aperture 44 being adapted to receive holding element 46 to be positioned therein with one end thereof projecting into second aperture 26 as shown in FIGS. 1 and 2, to thereby project holding element 46 into recess 42. Locking bar 18 is thus keyed against complete withdrawal from second aperture 26 while remaining capable of being slidably moved to the limited extent shown in FIGS. 1 and 2 of the drawings. Lock unit 30 may be secured to locking bar 18 by means such as holding screw 48 provided in locking bar 18 and engaging lock unit 30. Recess 34 and third aperture 44 of casing 22 may be formed in line, as, for example, by drilling the same therein prior to the insertion of locking bar 18 into second aperture 26.

Figure 4:
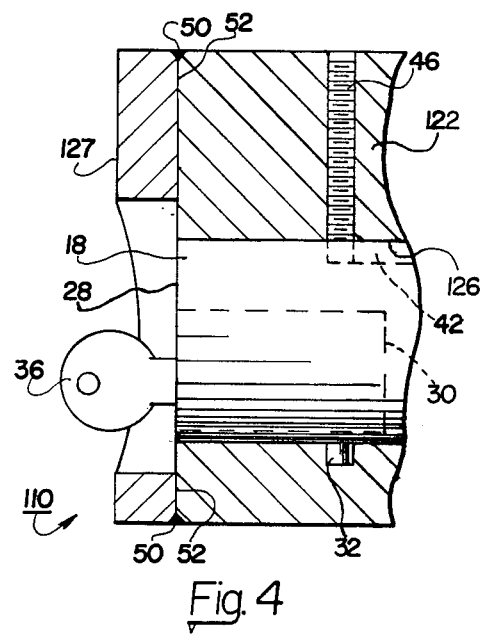
FIG. 4 is a portion of a medial, vertical elevational view through the locking device of the invention showing the embodiment in which the protrusion is welded onto the locking device casing.

FIG. 4 depicts a pertinent fragment of an alternate embodiment 110 of the locking device of this invention in which an originally separate protrusion element 127 is welded to the outer wall of a casing 122 in the area of the outer opening of second aperture 126 therein. A welding deposit or bead 50 is run around at least the entire outer edge of protrusion 127 at its interface 52 with casing 122, and welding may be done at the inner edge of that interface for increased security.

Thus, the instant invention provides a locking device for trailer kingpins in which the locking bar and the locking means of the device are protected from damage which might otherwise be inflicted upon them when a driver attempts to couple a tractor to a trailer which has a locking device accidentally still in place on the kingpin thereof. The device is characterized by a structure wherein the locking bar and locking means are recessed within an aperture in the casing of the locking device when the locking bar is in the locked position on a trailer kingpin. That is accomplished by means of a protrusion on the outer wall of the locking device casing in the area of the locking bar aperture. Further, the locking bar aperture from the outer end of the locking bar, when said locking bar is in the locked position, to the outer wall of the protrusion on the casing is counterbored beyond the transverse cross-section of the locking bar.

While specific embodiments of the present invention have been shown and described in detail, it is to be understood that such showings and descriptions are offered only by way of example and not by way of limitation. Protection by Letters Patent of this invention in all its aspects as the same are set forth in the appended claims is sought to the broadest extent that the prior art allows.

I claim as my invention:

1. In a locking device for use in connection with a trailer kingpin having a circumferential recess therein, said locking device comprising (1) a casing having a first aperture therein for receiving said kingpin and having a substantially thick wall surrounding said aperture, said casing being provided with a second aperture extending completely through the wall thereof and opening into said first aperture; (2) a locking bar having an inner end and an outer end and slidably disposed in said second aperture whereby upon predetermined inward sliding movement thereof its inner end enters said recess in the kingpin, said locking bar having further a determinate transverse cross-section normal to its line of sliding movement, and (3) a locking means disposed within the locking bar and engageable with and releasable from said casing, the improvement comprising a protrusion on the outer wall of the casing in the area of the second aperture whereby the outer end of said locking bar is recessed within said second aperture when said locking bar is in locked position extending into the recess in said kingpin, said second aperture from the outer end of said locking bar in locked position to the outer wall of the protrusion on said casing being counterbored beyond said transverse cross-section of said locking bar.

2. The improvement of claim 1 wherein the protrusion is welded to the outer wall of said casing.

3. The improvement of claim 1 wherein the protrusion is unitary with said casing.

4. The improvement of claim 3 wherein said casing is cylindrical and the protrusion is of limited arc covering the area where said second aperture extends through the outer wall of said casing.

* * * * *